(12) United States Patent
Kawai et al.

(10) Patent No.: US 12,034,127 B2
(45) Date of Patent: *Jul. 9, 2024

(54) SECONDARY BATTERY (71) Applicant: Murata Manufacturing Co., Ltd., Nagaokakyo (JP)

(72) Inventors: Toru Kawai, Nagaokakyo (JP); Masahiro Otsuka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 217 days.

This patent is subject to a terminal disclaimer.

(21) Appl. No.: 16/362,949

(22) Filed: Mar. 25, 2019

(65) Prior Publication Data

US 2019/0221892 A1 Jul. 18, 2019

Related U.S. Application Data (63) Continuation of application No. PCT/JP2017/039443, filed on Oct. 31, 2017.

(30) Foreign Application Priority Data

Dec. 6, 2016 (JP) ................................. 2016-237018

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0431* (2013.01); *H01M 10/0445* (2013.01);
(Continued)

(58) Field of Classification Search
CPC .. H01M 10/0587; H01M 50/10; H01M 50/40; H01M 50/172; H01M 50/543;
(Continued)

(56) References Cited

U.S. PATENT DOCUMENTS 6,689,511 B2 2/2004 Yamada et al.
7,862,919 B2 * 1/2011 Kim .................... H01M 50/209
429/162
(Continued)

FOREIGN PATENT DOCUMENTS

CN 104303332 A 1/2015
JP H0359954 A 3/1991
(Continued)

OTHER PUBLICATIONS

International Search Report issued in JP/2017/039443, date of mailing Jan. 16, 2018.

(Continued)

*Primary Examiner* — Brittany L Raymond
(74) *Attorney, Agent, or Firm* — ArentFox Schiff LLP (57) ABSTRACT

A secondary battery having an electrode assembly including a positive electrode, a negative electrode, and a separator arranged between the positive electrode and the negative electrode; an electrolyte; and an exterior body housing the electrode assembly and the electrolyte. The exterior body includes at least two step portions adjacent to each other and having top surfaces with different heights, and a stepped surface is formed between the top surface of the low step portion having a relatively low height and the top surface of the high step portion adjacent to the low step portion and having a relatively high height. The external terminal of the secondary battery is exposed on the end side surface of the step portion whose top surface has a height less than the highest height ($H_{max}$) among at least two step portions.

15 Claims, 9 Drawing Sheets (51) Int. Cl.
*H01M 10/0525* (2010.01)
*H01M 10/058* (2010.01)
*H01M 10/42* (2006.01)
*H01M 50/103* (2021.01)
*H01M 50/491* (2021.01)
*H01M 50/55* (2021.01)
*H01M 50/553* (2021.01)

(52) U.S. Cl.
CPC ..... *H01M 10/0525* (2013.01); *H01M 10/425* (2013.01); *H01M 50/103* (2021.01); *H01M 50/55* (2021.01); *H01M 50/553* (2021.01); *H01M 10/058* (2013.01); *H01M 50/491* (2021.01); *H01M 2220/30* (2013.01); *Y02E 60/10* (2013.01); *Y02T 10/70* (2013.01)

(58) Field of Classification Search
CPC ......... H01M 10/0431; H01M 10/0445; H01M 10/425; H01M 10/0525; H01M 10/058; H01M 2220/30; H01M 10/0585; H01M 50/102; H01M 50/103; H01M 50/105; H01M 50/207; H01M 50/284; H01M 50/55; Y02E 60/10; Y02T 10/70
See application file for complete search history.

(56) References Cited

U.S. PATENT DOCUMENTS

| | | | |
|---|---|---|---|
| 8,945,744 B2 | 2/2015 | Kwon et al. | |
| 9,431,679 B2 | 8/2016 | Kwon et al. | |
| 2001/0005561 A1 | 6/2001 | Yamada et al. | |
| 2012/0015236 A1* | 1/2012 | Spare | H01M 50/116 429/162 |
| 2014/0011070 A1 | 1/2014 | Kim et al. | |
| 2014/0050958 A1 | 2/2014 | Kwon et al. | |
| 2014/0099525 A1 | 4/2014 | Kwon et al. | |
| 2014/0113184 A1* | 4/2014 | Hamel | H01M 10/0436 429/163 |
| 2015/0340662 A1 | 11/2015 | Kwon et al. | |
| 2015/0372353 A1* | 12/2015 | Ryu | H01M 10/058 429/61 |
| 2016/0020434 A1* | 1/2016 | Kwon | H01M 50/557 429/161 |
| 2018/0026254 A1* | 1/2018 | Oh | H01M 50/55 429/153 |

FOREIGN PATENT DOCUMENTS

| | | |
|---|---|---|
| JP | 2001167743 A | 6/2001 |
| JP | 2002124232 A | 4/2002 |
| JP | 2003257385 A | 9/2003 |
| JP | 2014523629 A | 9/2014 |
| JP | 2014524131 A | 9/2014 |
| JP | 2015176782 A | 10/2015 |
| JP | 2015536530 A | 12/2015 |

OTHER PUBLICATIONS

Written Opinion of the International Searching Authority issued in JP/2017/039443, date of mailing Jan. 16, 2018.
Chinese Office Action issued for Chinese Application No. 201780074939.4, date of Chinese Office Action Jul. 15, 2021.

* cited by examiner

SECONDARY BATTERY

CROSS REFERENCE TO RELATED APPLICATIONS

The present application is a continuation of International application No. PCT/JP2017/039443, filed Oct. 31, 2017, which claims priority to Japanese Patent Application No. 2016-237018, filed Dec. 6, 2016, the entire contents of each of which are incorporated herein by reference.

FIELD OF THE INVENTION

The present invention relates to a secondary battery.

BACKGROUND OF THE INVENTION

Secondary batteries that can be repeatedly charged and discharged have been used for various applications. For example, secondary batteries are used as a power source for electronic devices such as a smartphone and a laptop computer.

In recent years, demands for thickness reduction and downsizing of electronic devices have further increased. Along with this, it is required to efficiently provide a board or the like in a secondary battery in an electronic device. With respect to this, Patent Document 1 discloses a secondary battery having a stepped region.

Patent Document 1: Japanese Translation of PCT International Application Publication No. 2014-523629

SUMMARY OF THE INVENTION

The inventors of the present invention have found that when a secondary battery having a stepped region is used, the wiring structure may be complicated depending on the location of the external terminal of the secondary battery that is electrically connected to the board via wiring. It is thus an object of the present invention to provide a secondary battery having a stepped region configured to simplify the wiring structure required for connecting an external terminal of the secondary battery and a board.

In order to achieve the above object, an aspect of the present invention is a secondary battery having an electrode assembly including a positive electrode, a negative electrode, and a separator arranged between the positive electrode and the negative electrode; an electrolyte; and an exterior body which houses the electrode assembly and the electrolyte. According to some aspects, the exterior body has at least two step portions adjacent to each other and having top surfaces with different heights, wherein the at least two step portions include a low step portion and a high step portion, the low step portion having a height that is less than the height of the high stepped portion. According to some aspects, a stepped surface is formed between a top surface of the low step portion and a top surface of the high step portion, which is adjacent to the low step portion. According to some aspects, the external terminal of the secondary battery is configured to be exposed on an end side surface of the low step portion, the low step portion being the step portion whose top surface has a height that is less than a highest height ($H_{max}$) among the at least two step portions.

According to some aspects of the present invention, it is possible to simplify the wiring structure for connecting a board and the external terminal of the secondary battery having the stepped region.

DETAILED DESCRIPTION OF THE PREFERRED EMBODIMENTS

The secondary battery has a structure in which an electrode assembly and an electrolyte are housed and sealed in an exterior body. In the present specification, the term "secondary battery" refers to a battery that can be repeatedly charged and discharged. Therefore, the secondary battery of the present invention is not excessively bound by its name, and for example, "power storage device" and the like can be included in the subject of the present invention. The electrode assembly has a positive electrode, a negative electrode, and a separator arranged between the positive electrode and the negative electrode. Examples of types of electrode assemblies useful according to the present disclosure include a first type, a second type, and a third type.

Figure 9:
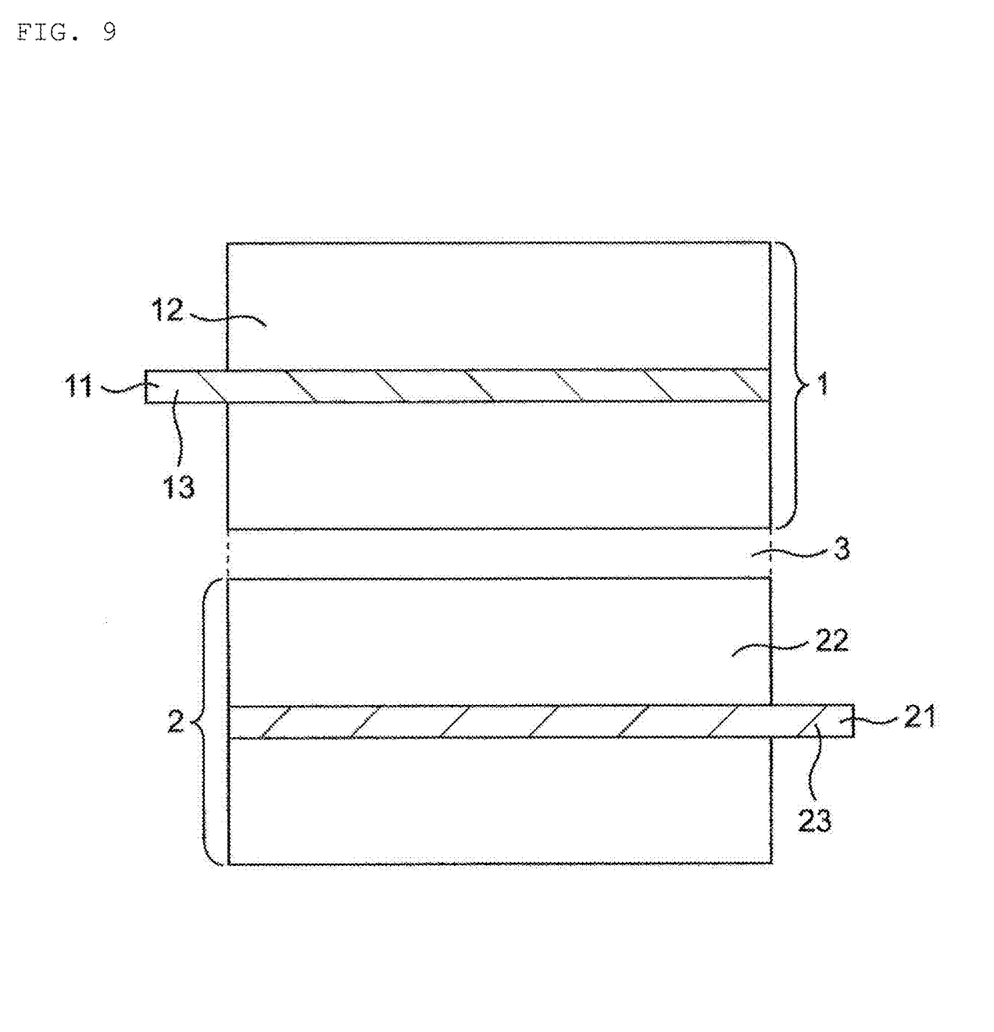
FIG. 9 is a cross-sectional view schematically showing a specific configuration of an electrode assembly.

In the first type, an electrode assembly 10A may have a planar laminated structure in which a plurality of unitary electrode units, including a positive electrode 1, 1A, a negative electrode 2, 2A, and a separator 3, 3A, are laminated (see FIG. 9).

In the second type, an electrode assembly 10B may have a winding structure in which the electrode unit, including a positive electrode 1, 1B, a negative electrode 2, 2B, and a separator 3, 3B, are wound in a roll shape (see FIG. 10).

In the third type, the electrode assembly may have a "stack-and-fold" structure formed by folding a negative electrode and the electrode unit having a positive electrode, a negative electrode, a separator. According to some aspects, in the third type, the electrode unit is laminated and extends in one direction.

According to some aspects, the exterior body may take the form of a conductive hard case or a flexible case (such as a pouch). When the form of the exterior body is a flexible case, each of the plurality of positive electrodes is connected to the cathode external terminal via a cathode current collector lead. The cathode external terminal is fixed to the exterior body by a seal portion, and the seal portion prevents electrolyte leakage. Similarly, each of the plurality of negative electrodes is connected to the anode external terminal via the anode current collector lead. The anode external terminal is fixed to the exterior body by a seal portion, and the seal portion prevents electrolyte leakage. Note that the present invention is not limited to the above. For example, the cathode current collector lead connected to each of the plurality of positive electrodes may have the function of the cathode external terminal, and the anode current collector lead connected to each of the plurality of negative electrodes may have the function of the anode external terminal.

When the form of the exterior body is a conductive hard case, each of the plurality of positive electrodes is connected to the cathode external terminal via a cathode current collector lead. The cathode external terminal is fixed to the exterior body by a seal portion, and the seal portion prevents electrolyte leakage.

The positive electrode 1 is composed of at least a cathode current collector 11 and a cathode material layer 12 (see FIG. 9), and the cathode material layer 12 is provided on at least one side of the cathode current collector 11. A cathode lead tab 13 is positioned on the portion of the cathode current collector 11 where the cathode material layer 12 is not provided, that is, the end of the cathode current collector 11. The cathode material layer 12 contains a cathode active substance as an electrode active material. The negative electrode 2 comprises at least an anode current collector 21 and an anode material layer 22 (see FIG. 9), and the anode material layer 22 is provided on at least one side of the anode current collector 21. An anode lead tab 23 is positioned on the portion of the anode current collector 21 where the anode material layer 22, that is, the end of the anode current collector 21. The anode material layer 22 contains an anode active substance as an electrode active material.

The cathode active substance comprised by the cathode material layer 12 and the anode active substance comprised by the anode material layer 22 are substances directly involved in the transfer of electrons in the secondary battery and are main substances of the positive and negative electrodes. The positive and negative electrodes are responsible for charging and discharging, that is, a cell reaction. More specifically, ions are generated in the electrolyte due to the cathode active substance contained in the cathode material layer 12 and the anode active substance contained in the anode material layer 22, and such ions are transferred between the positive electrode 1 and the negative electrode 2 to transfer electrons, resulting in charging and discharging.

According to some aspects, the cathode material layer 12 and the anode material layer 22 may be layers capable of storing and releasing lithium ions. That is, one aspect of the present disclosure is directed to a secondary battery in which lithium ions move between the positive electrode 1 and the negative electrode 2 via the electrolyte to charge and discharge the battery. When lithium ions are involved in charging and discharging, the secondary battery may be referred to as a "lithium ion battery".

The cathode active substance of the cathode material layer 12, which may comprise, for example, a granular material, may further comprise a binder (also referred to as a "binding material") for sufficient contact between grains and shape retention in the cathode material layer 12. Furthermore, a conductive auxiliary agent may be contained in the cathode material layer 12 in order to facilitate transmission of electrons for promoting the cell reaction. The anode active substance of the anode material layer 22, which may comprise, for example, a granular material, may further comprise a binder for sufficient contact between grains and shape retention. The anode material layer 22 may further comprise a conductive auxiliary agent for smooth transfer of electrons promoting a cell reaction. As described above, the cathode material layer 12 and the anode material layer 22 can also be referred to as the "cathode mixture material layer" the and "anode mixture material layer", respectively.

According to some aspects, the cathode active substance may be a substance configured to, at least in part, store and release lithium ions. In this respect, the cathode active substance may be, for example, a lithium-containing composite oxide. More specifically, the cathode active substance may be a lithium transition metal composite oxide containing lithium and at least one transition metal selected from the group consisting of cobalt, nickel, manganese, and iron. In the cathode material layer 12 of the secondary battery, such a lithium transition metal composite oxide, is preferably included as a cathode active substance. For example, the cathode active substance may comprise lithium cobalt oxide, lithium nickel oxide, lithium manganate, lithium iron phosphate, a material in which at least a portion of the transition metal comprised thereby is replaced with another metal, or a combination thereof. According to some aspects, the cathode active substance contained in the cathode material layer 12 is lithium cobalt oxide.

The binder which can be contained in the cathode material layer 12 is not particularly limited, but examples thereof may include at least one selected from the group consisting of polyvinylidene fluoride, vinylidene fluoride-hexafluoropropylene copolymer, vinylidene fluoride-tetrafluoroethylene copolymer, polytetrafluoroethylene, and combinations thereof. The conductive auxiliary agent which can be contained in the cathode material layer 12 is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative, and combinations thereof. The binder of the cathode material layer 12 may be polyvinylidene fluoride, and the conductive auxiliary agent of the cathode material layer 12 may be carbon black. In one example, the binder and the conductive auxiliary agent of the cathode material layer 12 may be a combination of polyvinylidene fluoride and carbon black.

The anode active substance may be a substance configured to, at least in part, store and release lithium ions. In this respect, the anode active substance be, for example, various carbon materials, oxides, or lithium alloys.

Examples of various carbon materials of the anode active substance useful according to the present disclosure may include graphite (e.g., natural graphite and artificial graphite), hard carbon, soft carbon, diamond-like carbon, and combinations thereof. In particular, graphite may be used due to its high electron conductivity and excellent adhesion to an anode current collector 21 and the like. Examples of the oxide of the anode active substance useful according to the present disclosure may include at least one selected from the group consisting of silicon oxide, tin oxide, indium oxide, zinc oxide, lithium oxide, and combinations thereof. The lithium alloy of the anode active substance may be any metal which can be alloyed with lithium. Examples thereof may include a binary, ternary, or higher alloy of a metal such as Al, Si, Pb, Sn, In, Bi, Ag, Ba, Ca, Hg, Pd, Pt, Te, Zn, and La, and lithium. According to some aspects, the oxide is amorphous as its structural form so as to reduce and/or eliminate degradation due to nonuniformity, such as grain boundaries or defects. In one example, the anode active substance of the anode material layer 22 may be artificial graphite.

The binder which can be contained in the anode material layer 22 is not particularly limited, but examples thereof may include at least one selected from the group consisting of styrene butadiene rubber, polyacrylic acid, polyvinylidene fluoride, polyimide resin, and polyamideimide resin. For example, the binder contained in the anode material layer 22 may be styrene butadiene rubber. The conductive auxiliary agent which can be contained in the anode material layer 22 is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative and combinations thereof. The anode material layer 22 may contain a component attributable to the thickener component (for example, carboxymethyl cellulose) used at the time of manufacturing the battery.

In one example, the anode active substance and the binder in the anode material layer 22 may be a combination of artificial graphite and styrene butadiene rubber.

The cathode current collector 11 and the anode current collector 21 used for the positive electrode 1 and the negative electrode 2 are members that contribute to the collection and supply of electrons generated in the active substance due to the cell reaction. Such a current collector may be a sheet-like metal member and may have a porous or perforated form. For example, the current collector may be a metal foil, a punching metal, a net, an expanded metal, or a combination thereof. The cathode current collector 11 used for the positive electrode 1 may be made of a metal foil containing at least one selected from the group consisting of aluminum, stainless steel, nickel and combinations thereof, and may be, for example, an aluminum foil. The anode current collector 21 used for the negative electrode 2 may be made of a metal foil containing at least one selected from the group consisting of copper, stainless steel, nickel and combinations thereof, and may be, for example, a copper foil.

The separator 3 used is a member provided in order to prevent short circuit, such as by contact of the positive and negative electrodes, retention of the electrolyte, and the like. In other words, the separator 3 is a member that passes ions while preventing electronic contact between the positive electrode 1 and the negative electrode 2. According to some aspects, the separator 3 may be a porous or microporous insulating member and may have a film form due to its relatively small thickness. For example, a microporous membrane made of polyolefin may be used as a separator. In this regard, the microporous membrane used as the separator 3 may be, for example, a polyolefin containing only polyethylene (PE) or polypropylene (PP). Furthermore, the separator 3 may be a laminate composed of a microporous membrane made of PE and a microporous membrane made of PP. The surface of the separator 3 may be covered with an inorganic particle coat layer and/or an adhesive layer. The surface of the separator may have adhesion. It should be noted that the separator 3 should not be particularly restricted by its name, and may be a solid electrolyte, a gel electrolyte, insulating inorganic particles, or any configuration which provides a similar function. In order to improve handling of the electrode, the separator 3 and at least one of the electrodes (i.e., the positive electrode 1 and/or the negative electrode 2) may be bonded. Adhesion between the separator 3 and the electrode(s) may be achieved by using an adhesive separator as the separator 3 and/or by applying an adhesive binder and/or thermocompression bonding on the electrode material layer (i.e., cathode material layer 12 and/or anode material layer 22). Examples of the adhesive that may provide adhesiveness to the separator 3 or the electrode material layer include polyvinylidene fluoride, an acrylic adhesive, and combinations thereof.

According to some aspects, when the positive electrode 1 and the negative electrode 2 have a layer capable of absorbing and releasing lithium ions, the electrolyte may preferably be a "nonaqueous" electrolyte such as an organic electrolyte and/or an organic solvent (for example, a nonaqueous electrolyte). Metal ions released from the electrodes (that is, positive electrode 1 and negative electrode 2) are present in the electrolyte, and therefore the electrolyte helps the movement of metal ions in the cell reaction.

The nonaqueous electrolyte may be an electrolyte containing a solvent and a solute. It is preferable to include at least carbonate as a specific solvent for the nonaqueous electrolyte. Such carbonate may be cyclic carbonates and/or chain carbonates. Although not particularly limited, examples of cyclic carbonates may include at least one selected from the group consisting of propylene carbonate (PC), ethylene carbonate (EC), butylene carbonate (BC), vinylene carbonate (VC), and combinations thereof. Examples of chain carbonates may include at least one selected from the group consisting of dimethyl carbonate (DMC), diethyl carbonate (DEC), ethyl methyl carbonate (EMC), dipropyl carbonate (DPC), and combinations thereof. In one example, a combination of cyclic carbonates and chain carbonates may be used as the nonaqueous electrolyte, such as, for example, a mixture of ethylene carbonate and diethyl carbonate. As a specific nonaqueous electrolyte solute, for example, Li salt such as $LiPF_6$ or $LiBF_4$ may be used. As a specific nonaqueous electrolyte solute, for example, Li salts such as $LiPF_6$ and/or $LiBF_4$ may be used.

Any current collector lead used in the field of secondary batteries may be used as the cathode current collector lead and the anode current collector lead. Such a current collector lead may be made of a material from which electron transfer can be achieved, such as, for example, a conductive material such as aluminum, nickel, iron, copper, stainless steel, or a combination thereof. The cathode current collector lead may preferably be made of aluminum, and the anode current collector lead may preferably be made of copper. The form of the cathode current collector lead and the anode current collector lead is not particularly limited, and for example, it may be in the shape of a line or a plate.

Any external terminal used in the field of secondary batteries can be used as the external terminal. Such an external terminal may be made of a material in which electron transfer can be achieved, and is generally made of a conductive material such as aluminum, nickel, iron, copper, stainless steel, or a combination thereof. The external terminal 5 may be electrically and directly connected to the board or may be electrically and indirectly connected to the board via another device. Note that the present invention is not limited to this, as the cathode current collector lead electrically connected to each of the plurality of positive electrodes may function as the cathode external terminal, and the anode current collector lead electrically connected to each of the plurality of negative electrodes may function as the anode external terminal.

The exterior body may be in the form of a conductive hard case or a flexible case (such as a pouch), as described above.

The conductive hard case may comprise a main body and a lid. The main body comprises a bottom portion having a bottom surface and a side portion. The main body and the lid are sealed after the electrode has been assembled, that is, after the electrolyte, the current collector lead, and the external terminal have been housed. The sealing method is not particularly limited, and for example, a laser irradiation method may be used. Any material that can constitute a hard case exterior body in the field of secondary batteries can be used as the material constituting the main body and the lid. Such a material may be any material in which electron transfer can be achieved, and includes, for example, a conductive material such as aluminum, nickel, iron, copper, stainless steel, and combinations thereof. The dimensions of the main body and the lid are determined mainly by the dimensions of the electrode assembly. For example, when the electrode assembly is housed, it is preferable that the electrode assembly have dimensions that can prevent movement (e.g., a shift) of the electrode assembly in the exterior body. Breakage of the electrode assembly is prevented by preventing movement of the electrode assembly, thereby improving the safety of the secondary battery.

The flexible case may comprise a flexible sheet. The flexible sheet may have softness sufficient to provide for folding of the seal portion, such as a plastic sheet. The plastic sheet may be a sheet configured such that deformation by an external force is maintained when the external force is applied and then removed. For example, a laminate film may be used. In particular, a flexible pouch made of a laminate film may be manufactured by laminating two laminate films and heat sealing the peripheral edge portions thereof. According to some aspects, a film formed by laminating a metal foil and a polymer film may be used, for example, a three-layered film comprised of a polymer film as an outer layer, a metal foil, and a polymer film as an inner layer. The outer layer polymer film prevents the metal foil from being damaged due to permeation by and contact with moisture, and a polymer such as polyamide or polyester can be preferably used. The metal foil prevents permeation of moisture and gas, and a foil made of copper, aluminum, stainless steel, or combinations thereof can be preferably used. The inner layer polymer film protects the metal foil from the electrolyte contained therein and melts it at the time of heat sealing to enclose the electrolyte, and polyolefin or acid-modified polyolefin can be preferably used.

A secondary battery according to aspects of the present invention will be described below in consideration of the basic configuration of the secondary battery. It is to be noted that the secondary battery according to aspects of the present invention is premised on the assumption that it is a secondary battery having a stepped region.

Figure 1:
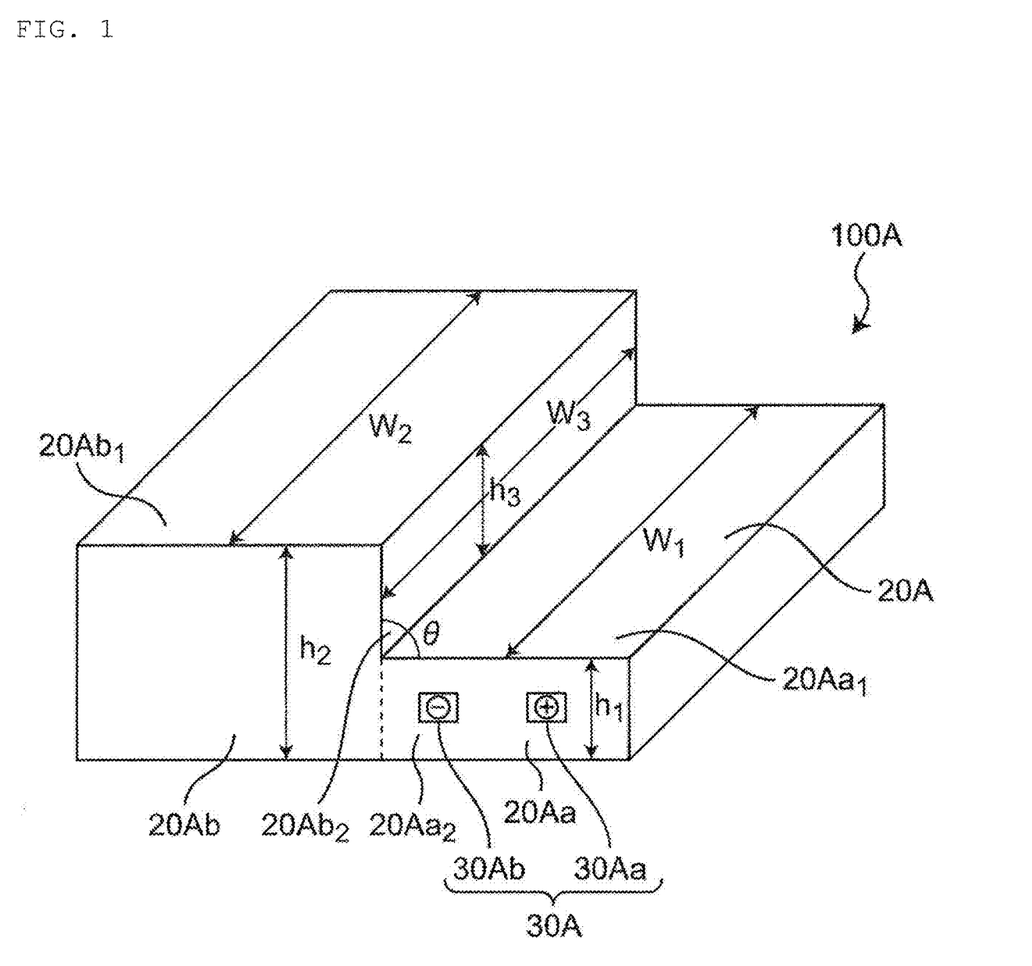
FIG. 1 is a perspective view schematically showing a secondary battery according to aspects of the present invention.

FIG. 1 is a perspective view schematically showing a secondary battery according to aspects of the present invention. As shown in FIG. 1, a secondary battery 100A may have a structure in which an electrode assembly and an electrolyte are housed and sealed in the exterior body 20A. As shown in FIG. 1, the exterior body 20A includes two step portions (a first step portion 20Aa and a second step portion 20Ab). The two step portions are configured so as to be adjacent to each other and to have mutually different heights. Specifically, the first step portion 20Aa and the second step portion 20Ab are adjacent to each other, and the height $h_2$ of the top surface $20Ab_1$ of the second step portion 20Ab is larger than the height $h_1$ of the top surface $20Aa_1$ of the first step portion 20Aa. Since the height level of the top surface $20Aa_1$ of the first step portion 20Aa and the height level of the top surface $20Ab_1$ of the second step portion 20Ab are different from each other, the stepped surface $20Ab_2$ is formed between the top surface $20Aa_1$ of the first step portion 20Aa and the top surface $20Ab_1$ of the second step portion 20Ab. As shown in FIG. 1, the first step portion 20Aa and the second step portion 20Ab are configured such that the width dimension $W_2$ (longitudinal direction) of the top surface $20Ab_1$ of the second step portion 20Ab is equal to the width dimension W1 (longitudinal direction) of the top surface $20Aa_1$ of the first step portion 20Aa.

The stepped surface $20Ab_2$ has a height $h_3$ and a width dimension (longitudinal direction) $W_3$. The height $h_3$ of the stepped surface $20Ab_2$ is equal to the difference between the height $h_2$ of the top surface $20Ab_1$ of the second step portion 20Ab and the height $h_1$ of the top surface $20Aa_1$ of the first step portion 20Aa. The width $W_3$ (longitudinal direction) of the stepped surface $20Ab_2$ is set to be equal to the width dimension $W_2$ (longitudinal direction) of the top surface $20Ab_1$ of the second step portion 20Ab and the width dimension $W_1$ (longitudinal direction) of the top surface $20Aa_1$ of the first step portion 20Aa.

The stepped surface $20Ab_2$ is configured to be continuous with the top surface $20Aa_1$ of the first step portion 20Aa. Specifically, the top surface $20Aa_1$ of the first step portion 20Aa is continuous with the stepped surface $20Ab_2$ so as to extend in a direction different from the extending direction of the stepped surface $20Ab_2$. Although it is not particularly limited, the top surface $20Aa_1$ of the first step portion 20Aa may extend in a direction perpendicular to the extending direction of the stepped surface $20Ab_2$. That is, the angle θ between the stepped surface $20Ab_2$ and the top surface $20Aa_1$ of the first step portion 20Aa may be 90 degrees. Note that without being limited to this, the angle θ between the stepped surface $20Ab_2$ and the top surface $20Aa_1$ of the first step portion 20Aa may be from 30 degrees to 150 degrees in consideration of the arrangement mode of the board to be described later, optionally from 50 degrees to 130 degrees, optionally from 70 degrees to 110 degrees.

Further, an external terminal 30A (i.e., a cathode external terminal 30Aa and an anode external terminal 30Ab) for a secondary battery is provided on the surface of the exterior body 20A. The external terminal 30A is configured to be exposed on the end side surface $20Aa_2$ of the first step portion 20Aa. When the external terminal 30A is present on the end side surface $20Aa_2$ of the first step portion 20Aa, the length of the wiring connecting the external terminal 30A and the board can be made relatively short, and further, the wiring can be oriented substantially vertically when compared with the case where the external terminal 30A is positioned on the side surface (excluding the side surface corresponding to the stepped surface $20Ab_2$) of the second step portion 20Ab and/or the top surface $20Ab_1$. The effect may be due at least in part to the fact that the external terminal 30A can be positioned in the substantially vertically downward region of the board. In particular, this effect may result at least in part from providing a board from the viewpoint of efficient utilization of a space region formed between the stepped surface $20Ab_2$ and the top surface $20Aa_1$ of the first step portion 20Aa (corresponding to the stepped region described above, and specifically, a space region on the top surface $20Aa_1$ of the first step portion 20Aa).

The above-mentioned board may be a rigid board or a flexible board. Any rigid board used in the field of boards used together with a secondary batteries can be used, such as a glass-epoxy resin board. Examples of the board include a circuit board such as a printed board and a protective circuit board, a semiconductor board such as a silicon wafer, a glass board such as a display panel, and combinations thereof. When the board is a protective circuit board for preventing overcharge, overdischarge, and overcurrent of the secondary battery, a secondary battery pack may be configured from the protective circuit board and the secondary battery.

Figure 2:
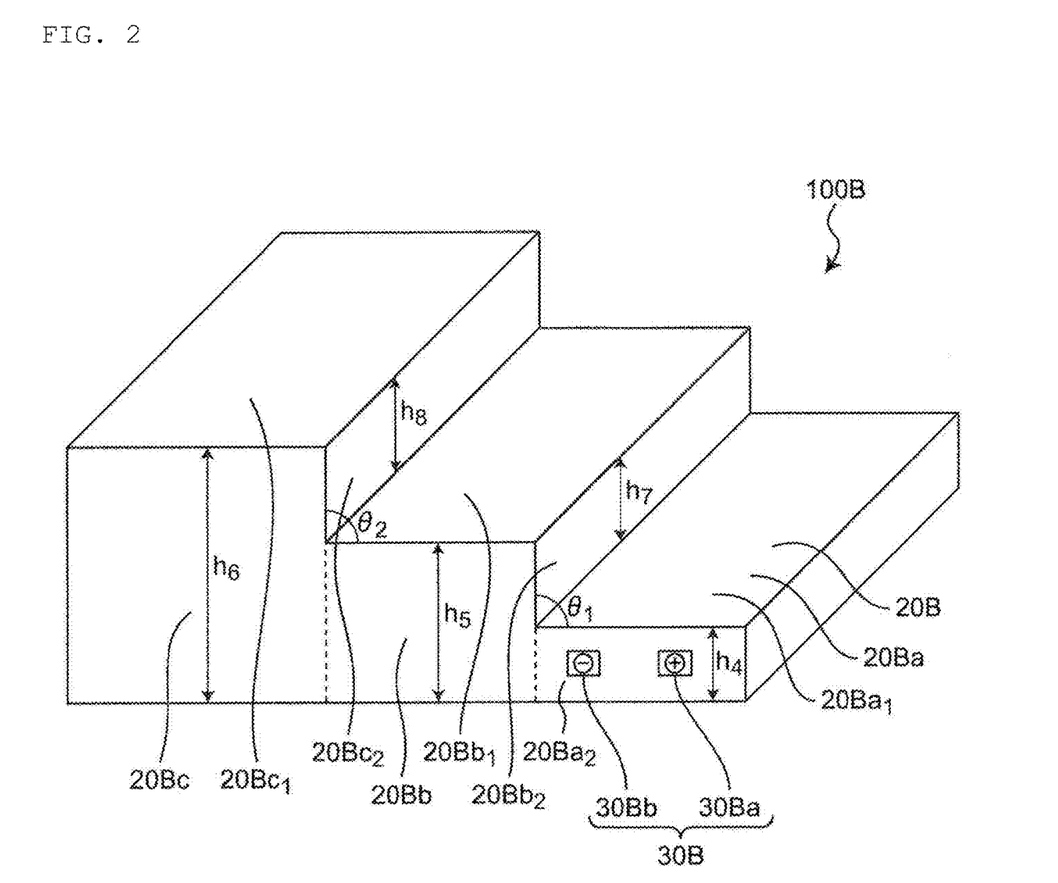
FIG. 2 is a perspective view schematically showing a secondary battery according to aspects of the present invention.

FIG. 2 is a perspective view schematically showing another aspect of the present invention. As shown in FIG. 2, a secondary battery 100B may have a structure in which an electrode assembly and an electrolyte are housed and sealed in an exterior body 20B. As shown in FIG. 2, the exterior body 20B includes three step portions (a first step portion 20Ba, a second step portion 20Bb, and a third step portion 20Bc). The three step portions are arranged so as to be adjacent to each other and to have mutually different heights. Specifically, the first step portion 20Ba and the second step portion 20Bb are adjacent to each other, and the height $h_5$ of the top surface $20Bb_1$ of the second step portion 20Bb is larger than the height $h_4$ of the top surface $20Ba_1$ of the first step portion 20Ba. In addition, the second step portion 20Bb and the third step portion 20Bc are adjacent to each other, and the height $h_6$ of the top surface $20Bc_1$ of the third step portion 20Bc is larger than the height $h_5$ of the top surface $20Bb_1$ of the second step portion 20Bb.

The height of the top surface $20Ba_1$ of the first step portion 20Ba and the height of the top surface $20Bb_1$ of the second step portion 20Bb are different from each other, whereby the first stepped surface $20Bb_2$ is formed between the top surface $20Ba_1$ of the first step portion 20Ba and the top surface $20Bb_1$ of the second step portion 20Bb. The height of the top surface $20Bb_1$ of the second step portion 20Bb and the height of the top surface $20Bc_1$ of the third step portion 20Bc are different from each other, whereby the second stepped surface $20Bc_2$ is formed between the top surface $20Bb_1$ of the second step portion 20Bb and the top surface $20Bc_1$ of the third step portion 20Bc.

The first stepped surface $20Bb_2$ has a height $h_7$. The height $h_7$ of the first stepped surface $20Bb_2$ is equal to the difference between the height $h_5$ of the top surface $20Bb_1$ of the second step portion 20Bb and the height $h_4$ of the top surface $20Ba_1$ of the first step portion 20Ba. In addition, the second stepped surface $20Bc_2$ has a height $h_8$. The height $h_8$ of the second stepped surface $20Bc_2$ is equal to the difference between the height $h_6$ of the top surface $20Bc_1$ of the third step portion 20Bc and the height $h_5$ of the top surface $20Bb_1$ of the second step portion 20Bb.

The first stepped surface $20Bb_2$ is configured to be continuous with the top surface $20Ba_1$ of the first step portion 20Ba. Specifically, the top surface $20Ba_1$ of the first step portion 20Ba is continuous with the first stepped surface $20Bb_2$ so as to extend in a direction different from the extending direction of the first stepped surface $20Bb_2$. Although it is not particularly limited, the top surface $20Ba_1$ of the first step portion 20Ba may extend in a direction perpendicular to the extending direction of the first stepped surface $20Bb_2$. That is, the angle θ1 between the first stepped surface $20Bb_2$ and the top surface $20Ba_1$ of the first step portion 20Ba may be 90 degrees. Note that without being limited to this, the angle θ1 between the first stepped surface $20Bb_2$ and the top surface $20Ba_1$ of the first step portion 20Ba may be from 30 degrees to 150 degrees in consideration of the arrangement mode of the board described later, optionally from 50 to 130 degrees, and optionally from 70 to 110 degrees. Similarly, the second stepped surface $20Bc_2$ is configured to be continuous with the top surface $20Bb_1$ of the second step portion 20Bb. Specifically, the top surface $20Bb_1$ of the second step portion 20Bb is continuous with the second stepped surface $20Bc_2$ so as to extend in a direction different from the extending direction of the second stepped surface $20Bc_2$. Although it is not particularly limited, the top surface $20Bb_1$ of the second step portion 20Bb may extend in a direction perpendicular to the extending direction of the second stepped surface $20Bc_2$. That is, the angle θ2 between the second stepped surface $20Bc_2$ and the top surface $20Bb_1$ of the second step portion 20Bb may be 90 degrees. Note that without being limited to this, the angle θ2 between the second stepped surface $20Bc_2$ and the top surface $20Bb_1$ of the second step portion 20Bb may be from 30 degrees to 150 degrees in consideration of the arrangement mode of the board described later, optionally from 50 to 130 degrees, and optionally from 70 to 110 degrees.

An external terminal 30B (i.e., a cathode external terminal 30Ba and an anode external terminal 30Bb) for a secondary battery is provided on the surface of the exterior body 20B. As shown in FIG. 2, external terminal 30B is configured to be exposed on the end side surface $20Ba_2$ of the first step portion 20Ba and/or the end side surface $20Bb_2$ of the second step portion 20Bb. When the external terminal 30B is present on the end side surface $20Ba_2$ of the first step portion 20Ba and/or the end side surface $20Bb_2$ of the second step portion 20Bb, the length of the wiring connecting the external terminal 30B and the board can be made relatively short, and further, the wiring can be oriented substantially vertically when compared with the case where the external terminal 30B is positioned on the side surface of the third step portion 20Bc (excluding the side surface corresponding to the second stepped surface $20Bc_2$) and/or the top surface $20Bc_1$, as the external terminal 30B can be positioned in the substantially vertically downward region of the board. In particular, this effect may result at least in part from providing a board, from the viewpoint of efficient installation, in the space region formed between the first stepped surface $20Bb_2$ and the top surface $20Ba_1$ of the first step portion 20Ba (corresponding to the stepped region described above, and specifically, on the top surface $20Ba_1$ of the first step portion 20Ba) and/or in the space region formed between the second stepped surface $20Bc_2$ and the top surface $20Bb_1$ of the second step portion 20Bb (specifically, on the top surface $20Bb_1$ of the second step portion 20Bb).

As is clear from the above description, an exterior body which is a component of a secondary battery according to the present invention has at least two step portions, and an external terminal of the secondary battery is configured to be exposed on the end side surface of the step portion that has a height less than the highest height ($H_{max}$) among the at least two step portions. The "height of the top surface" or simply the "height" refers to the linear dimension along the substantially vertical direction between the bottom surface and the top surface of the step portion, which is a component of the exterior body. Although it is not particularly limited, the external terminal may be configured to be exposed on the end side surface of the step portion that has a lowest height ($H_{min}$). Because of this configuration, the external terminal can be positioned in the substantially vertically downward region of the board, and, compared with the case where the external terminal is positioned on the step portion (excluding the side surface corresponding to the stepped surface) whose top surface has the highest height ($H_{max}$) the wiring can be oriented substantially vertically, and the length of the wiring connecting the external terminal and the board can be made relatively short. That is, the structure of the wiring connecting the external terminal and the board can be simplified.

According to some aspects, the exterior body, which is a component of the secondary battery, has at least two step portions, specifically a low step portion and a high step portion, wherein the low step portion has a height that is less than the height of a high step portion adjacent thereto. Since the top surface of the low step portion and the top surface of the high step portion have different heights from each other, they form a stepped surface between the top surface of the low step portion and the top surface of the high step portion. In this way, the exterior body has a stepped structure formed between the stepped surface and the top surface of the low step portion. From the viewpoint of prevention of movement (e.g., shift) of the electrode assembly arranged in the exterior body having the stepped structure, it is preferable to have a stepped structure having substantially the same shape as the exterior body in a section view.

It is to be noted that the following description is merely an example, and it is presumed that the electrode assembly is provided inside the exterior body having two step portions.

Figure 7:
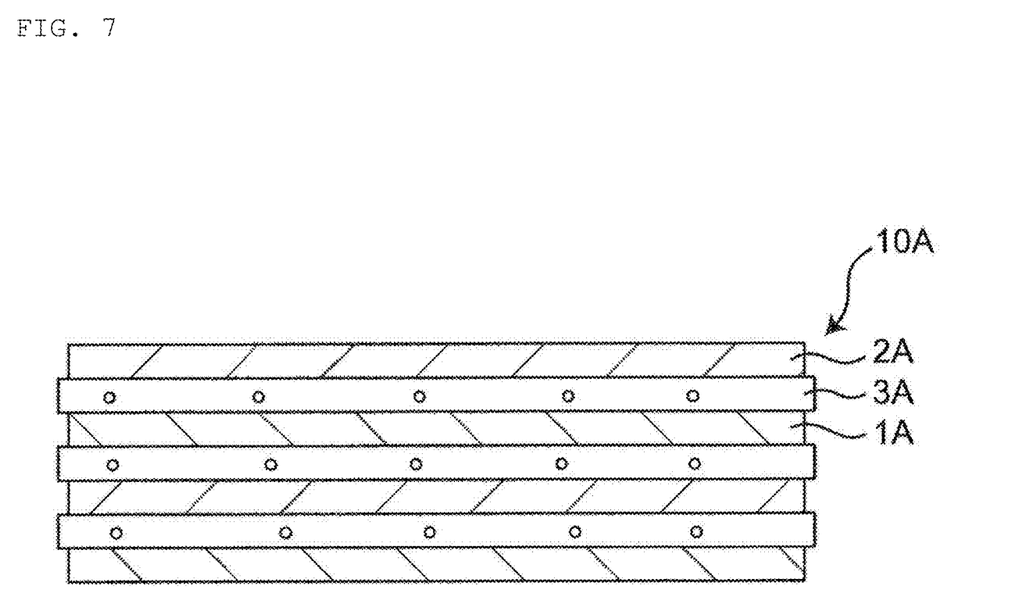
FIG. 7 is a cross-sectional view schematically showing a basic configuration of an electrode assembly having a planar laminated structure.
Figure 8:
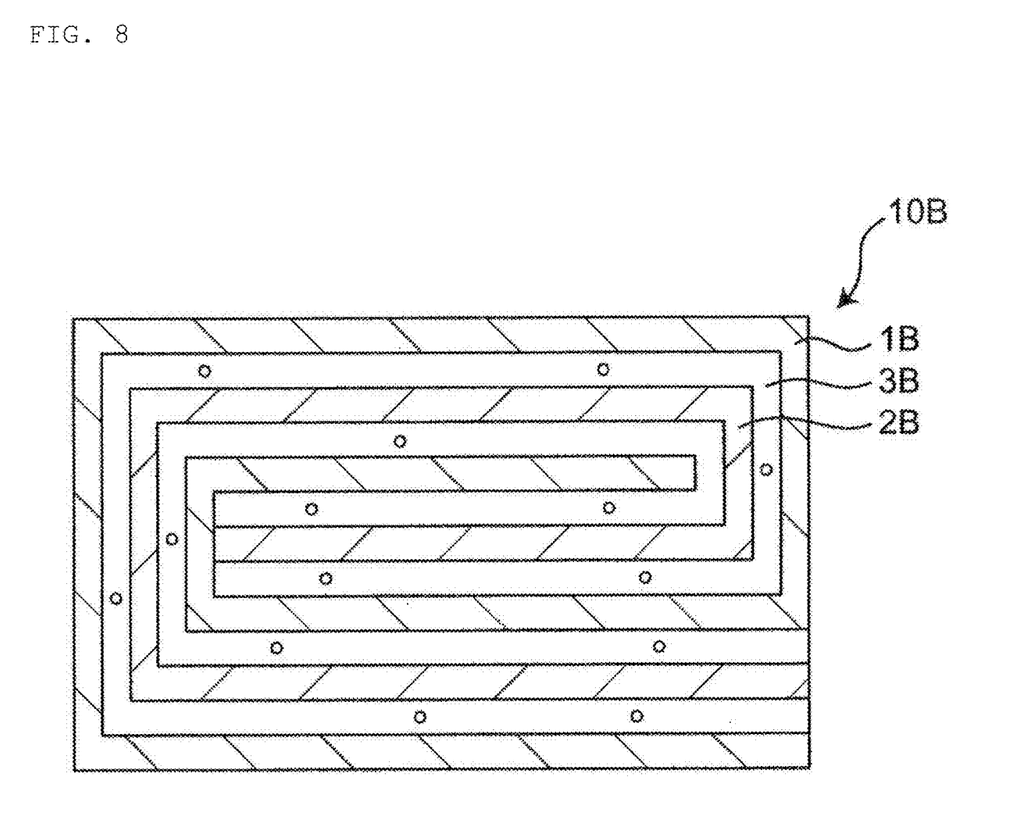
FIG. 8 is a cross-sectional view schematically showing a basic configuration of an electrode assembly having a winding structure.

The electrode assembly, which is a component of the secondary battery, includes a positive electrode, a negative electrode, and a separator arranged between the positive electrode and the negative electrode as described above. The electrode may be a planar laminated structure type, wherein the electrode assembly 10A is formed by laminating a plurality of unitary electrode units including the positive electrode 1, 1A, the negative electrode 2, 2A, and the separator 3, 3A (see FIG. 7) In a winding structure type, the electrode assembly 10B is formed by winding an electrode unit including the positive electrode 1, 1B, the negative electrode 2, 2B, and the separator 3, 3B in a roll shape (see FIG. 8). A stack-and-fold structure type may be formed by folding a negative electrode (such as a laminate electrode unit extending in one direction) and the electrode unit comprised of a positive electrode, a negative electrode, a separator.

Figure 3:
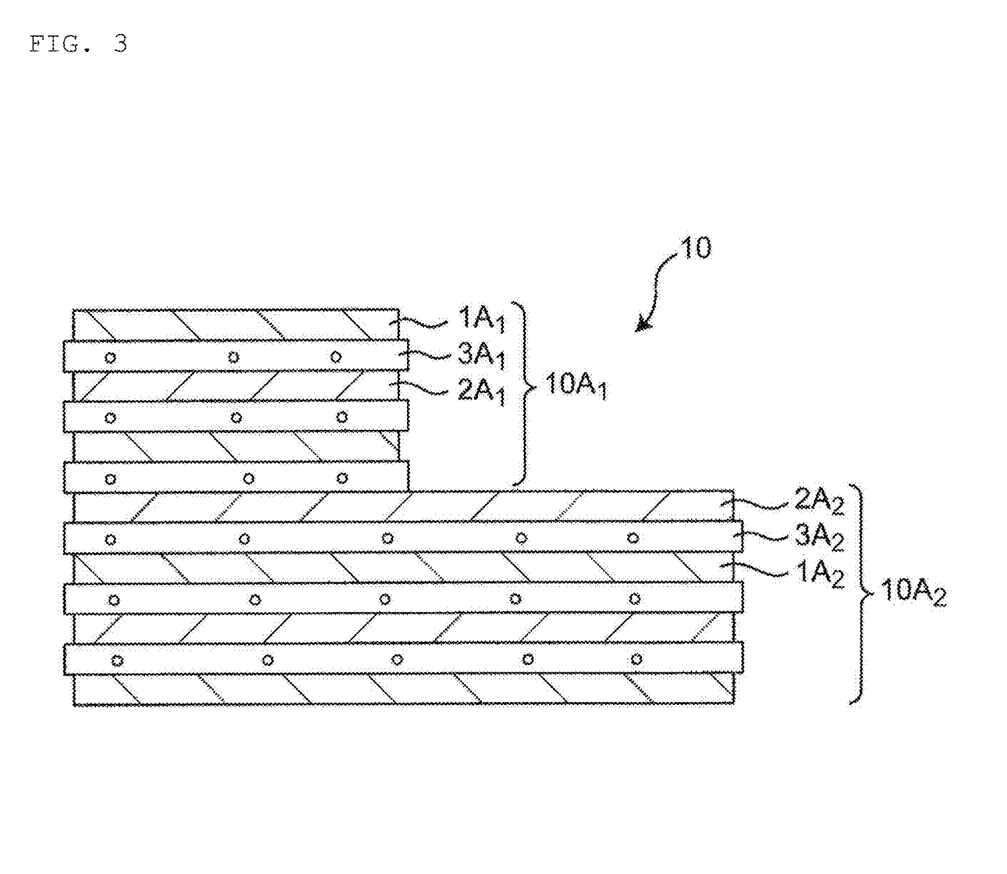
FIG. 3 is a cross-sectional view schematically showing an electrode assembly according to aspects of the present invention.

The electrode assembly 10 may include at least two planar laminated structure sub-electrode assemblies (see FIG. 3). For example, the electrode assembly 10 may include a first planar laminated structure sub-electrode assembly $10A_1$ and a second planar laminated structure sub-electrode assembly $10A_2$. The first planar laminated structure sub-electrode assembly $10A_1$ is formed by laminating a plurality of unitary electrode units, including a positive electrode $1A_1$, a negative electrode $2A_1$, and a separator $3A_1$. The second planar laminated structure sub-electrode assembly $10A_2$ is formed by laminating a plurality of unitary electrode units including a positive electrode $1A_2$, a negative electrode $2A_2$, and a separator $3A_2$.

In one example, in the electrode assembly 10, the second planar laminated structure sub-electrode assembly $10a_2$ may have a width dimension larger than the width dimension of the first planar laminated structure sub-electrode assembly $10a_1$ in a section view as shown in FIG. 3, and may be in mutual contact with the first planar laminated structure sub-electrode assembly $10a_1$ so as to be located below the first planar laminated structure sub-electrode assembly $10a_1$. In this way, the electrode assembly 10 may have a stepped structure in the section view.

Hereinafter, the electrode assembly, which is a component of the secondary battery, will be described on the premise that it has a stepped structure in a section view. The term "connection tab" as used herein refers to a portion corresponding to the uncoated portion of the electrode (i.e., the positive electrode and/or negative electrode), and a member not joined to the current collector lead. The term "connection portion" as used herein refers to a member configured to be connectable to each of the plurality of connection tabs. The term "lead tab" as used herein refers to a portion corresponding to the uncoated portion of the electrode (i.e., the positive electrode and/or negative electrode), and a member joined to the current collector lead. Further, the term "lead portion" as used herein refers to a member configured to be connectable with each of the plurality of lead tabs.

Figure 4:
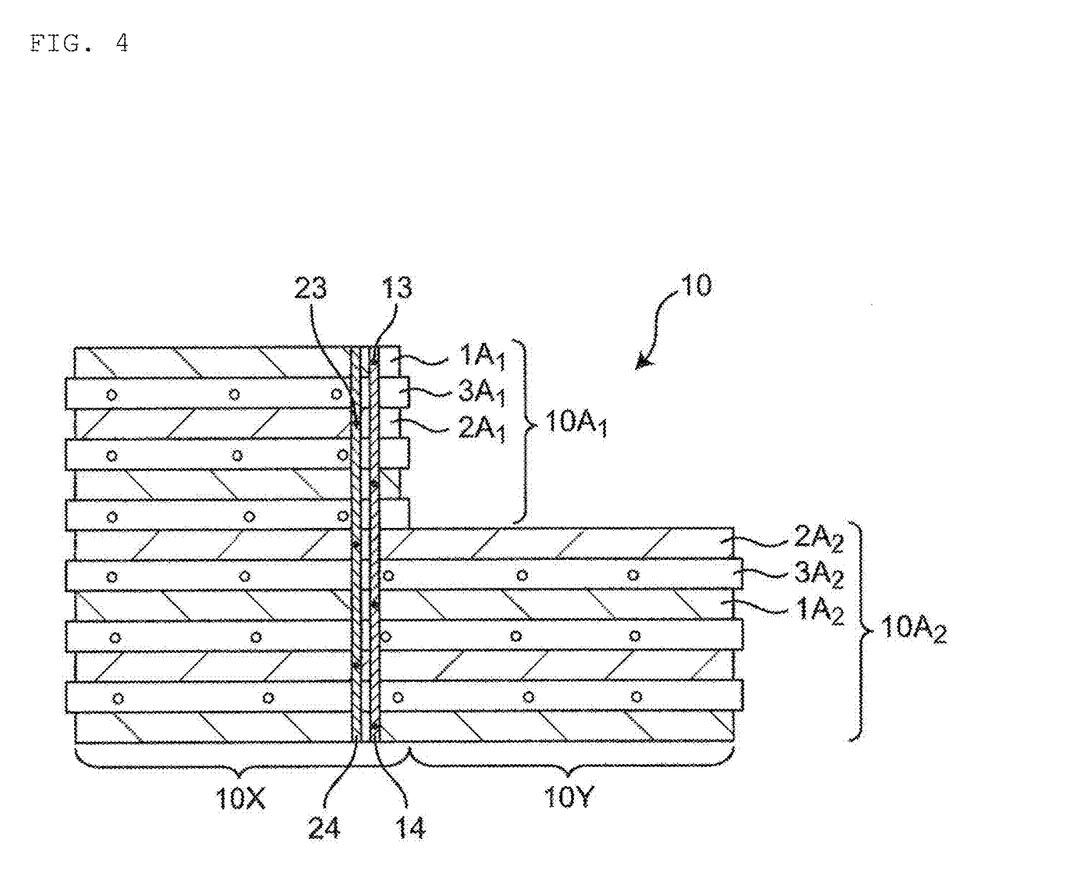
FIG. 4 is a cross-sectional view schematically showing a mode in which electrode tabs of an electrode assembly are connected only by a lead portion.

As shown in FIG. 4, in a section view, the electrode assembly 10 having a stepped structure may have a first region 10X that has a high height relative to the height of a second region 10Y that is continuous with the first region 10X.

The cathode lead tabs 13 included in each of the plurality of positive electrodes (i.e., the positive electrode $1A_1$ of the first planar laminated structure sub-electrode assembly $10A_1$ in the first region 10X and the positive electrode $1A_2$ of the second planar laminated structure sub-electrode assembly $10A_2$ in the first region 10X) are connected with each other by a cathode lead portion 14, as shown in FIG. 4. In order to connect each of the plurality of cathode lead tabs 13, the cathode lead portion 14 may be configured to extend in one direction substantially perpendicular to the extending direction of the cathode lead tabs 13. In another example, the cathode lead portion 14 may be configured to be connected to each of the plurality of cathode lead tabs 13 from a predetermined position.

The anode lead tabs 23 included in each of the plurality of negative electrodes (i.e., the negative electrode $2A_1$ of the first planar laminated structure sub-electrode assembly $10A_1$ and the negative electrode $2A_2$ of the second planar laminated structure sub-electrode assembly $10A_2$ located in the first region 10X) are mutually connected by an anode lead portion 24 as shown in FIG. 4. In order to connect each of the plurality of anode lead tabs 23, the anode lead portion 24 is configured to extend in one direction substantially perpendicular to the extending direction of the anode lead tabs 23. In another example, the anode lead portion 24 is configured to be connected to each of a plurality of anode lead tabs 23 from a predetermined position.

The cathode lead portion 14, which mutually connects all of the positive electrodes in the first region 10X, may be configured to be electrically connected to the external terminal (for example, the external terminal 30Aa in FIG. 1 or the external terminal 30Ba in FIG. 2, etc.) via the cathode current collector lead.

The anode lead portion 24, which mutually connects all of the negative electrodes in the first region 10X, may be configured to be electrically connected to the external terminal (for example, the external terminal 30Ab in FIG. 1 or the external terminal 30Bb in FIG. 2, etc.) via the anode current collector lead.

All of the positive electrodes may be mutually connected by the single cathode lead portion 14, so that it is possible to stabilize the electrical connection between the respective positive electrodes. All of the negative electrodes may be mutually connected by the single anode lead portion 24, so that it is possible to stabilize the electrical connection between the respective negative electrodes. As described above, since it is possible to stably generate a cell reaction at all electrodes, it is possible to stabilize the battery characteristics.

The present invention should not be limited to the above description.

Figure 5:
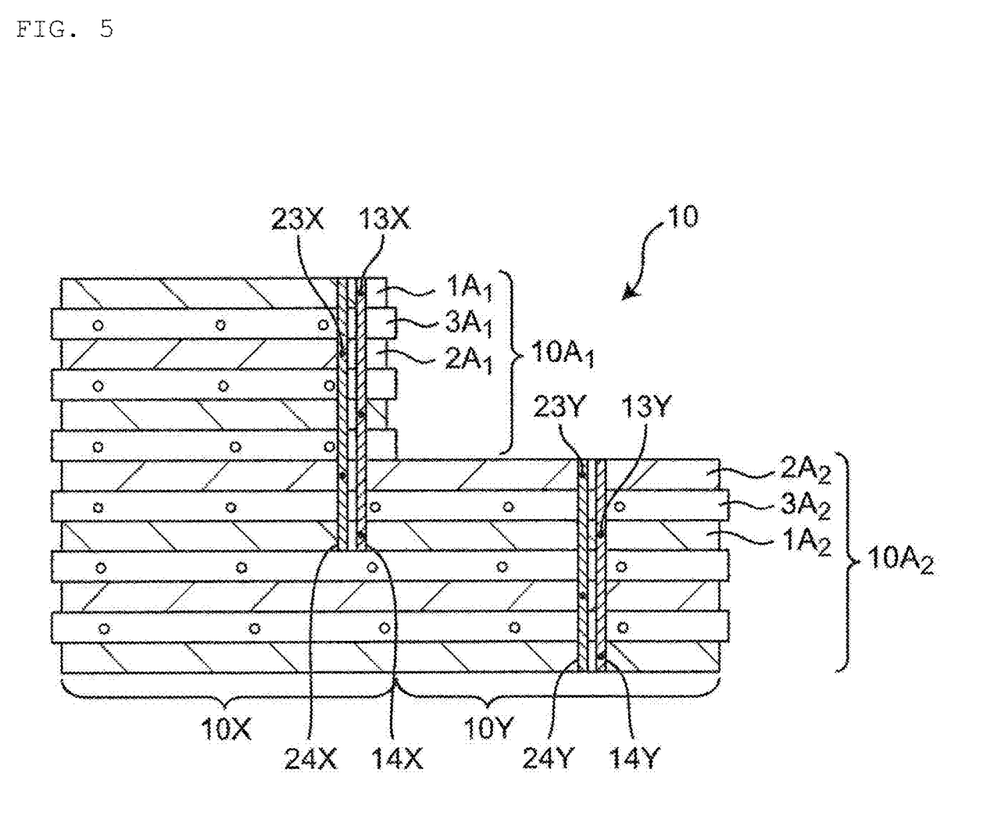
FIG. 5 is a cross-sectional view schematically showing a mode in which electrode tabs of an electrode assembly is connected by a combination of a lead portion and a connection portion.

For example, the respective cathode connection tabs 13X comprise by a portion of the positive electrodes among the plurality of the positive electrodes may be connected with each other by a cathode connection portion 14X as shown in FIG. 5. In order to connect a portion of the plurality of cathode connection tabs 13X, for example, the cathode connection portion 14X may be configured to extend in one direction substantially perpendicular to the extending direction of the cathode connection tabs 13X. In another example, the cathode connection portion 14X may be configured to be connected to a portion of the plurality of cathode connection tabs 13X from a predetermined position. Similarly, the respective anode connection tabs 23X comprise by a portion of the plurality of negative electrodes may be mutually connected by an anode connection portion 24X as shown in FIG. 5. In order to connect a portion of the plurality of anode connection tabs 23X, for example, the anode connection portion 24X may be configured to extend in one direction substantially perpendicular to the extending direction of the anode connection tabs 23X. In another example, the second anode connection portion 24X may be configured to be connected to a portion of the plurality of anode connection tabs 23X from a predetermined position.

As shown in FIG. 5, the positive electrode in the second region 10Y, more specifically, respective cathode lead tabs 13Y of at least two positive electrodes $1A_2$ of the second planar laminated structure sub-electrode assembly $10A_2$, may be mutually connected by a cathode lead portion 14Y. According to some aspects, in order to connect the respective cathode lead tabs 13Y, the cathode lead portion 14Y may be configured to extend in one direction substantially perpendicular to the extending direction of the cathode lead tabs 13Y. In one example, the cathode lead portion 14Y may be configured to be connected to the respective cathode lead tabs 13Y from a predetermined position.

Similarly, the negative electrode in the second region 10Y, more specifically, respective anode lead tabs 23Y of at least two the negative electrodes $2A_2$ of the second planar laminated structure sub-electrode assembly $10A_2$, may be mutually connected by an anode lead portion 24Y. In one example, in order to connect the respective anode lead tabs 24Y, the anode lead portion 24Y may be configured to extend in one direction substantially perpendicular to the extending direction of the anode lead tabs 23Y. In another example, the anode lead portion 24Y may be configured to be connected to the respective anode lead tabs 23Y from a predetermined position.

In this case, the cathode lead portion 14Y may be configured to be electrically connected to the external terminal (for example, the external terminal 30Aa in FIG. 1, the external terminal 30Ba in FIG. 2, etc.) via the cathode current collector lead.

Similarly, the anode lead portion 24Y may be configured to be electrically connected to the external terminal (for example, the external terminal 30Ab in FIG. 1, the external terminal 30Bb in FIG. 2, etc.) via the anode current collector lead.

As shown in FIG. 5, from the viewpoint of enabling the electrode assembly 10 to be electrically connected as a whole, it may be necessary for at least one positive electrode $1A_2$ located in the second region 10Y to be configured to be electrically connected mutually to at least one positive electrode $1A_1$ located in the first region 10X. Briefly, from the viewpoint of enabling the electrode assembly 10 to be electrically connected as a whole, it may be necessary for at least one positive electrode to have both the cathode connection tabs 13X and the cathode lead tabs 13Y in a plan view. Similarly, as shown in FIG. 5, from the viewpoint of making the electrode assembly 10 electrically conductive as a whole, it may be necessary for at least one negative electrode $2A_2$ located in the second region 10Y to be configured to be electrically connected mutually to at least one negative electrode $2A_1$ located in the first region 10X. Briefly, from the viewpoint of making the electrode assembly 10 electrically conductive as a whole, it may be necessary for at least one negative electrode to have both the anode connection tabs 23X and the anode lead tabs 23Y in a plan view.

As described above, the cathode lead portion configured to be electrically connected to the external terminal and the cathode connection portion provided to ensure electrical conduction between the respective positive electrodes are provided. Similarly, as described above, the anode lead portion configured to be electrically connected to the external terminal and the anode connection portion provided to ensure electrical conduction between the respective negative electrodes are provided. The lead portion and the connection portion are provided, and the respective positive electrodes and the respective negative electrodes can be electrically connected as a whole. Therefore, when the lead portion is installed at any position, it is possible to increase the degree of freedom of installation of the external terminal electrically connected to the lead portion.

According to some aspects, as shown in FIG. 5, it may be preferable for the cathode connection portion 14X and the anode connection portion 24X, and the cathode lead portion 14Y and the anode lead portion 24Y to be arranged on only one side in the exterior body. In this configuration, for example, it is possible to relatively reduce the width dimension of the electrode assembly 10 in a plan view due to the absence of the anode connection portion 24X and the anode lead portion 24Y on the other side of the electrode assembly 10, as compared with the case where the cathode connection portion 14X and the cathode lead portion 14Y are arranged on one side of the electrode assembly 10, and the anode connection portion 24X and the anode lead portion 24Y are arranged on the other side facing one side of the electrode assembly 10. Therefore, it is possible to relatively reduce the size of the exterior body housing of the electrode assembly 10 therein due to the relative reduction of the width dimension of the electrode assembly 10. That is, the size of the secondary battery may be relatively small.

Figure 6:
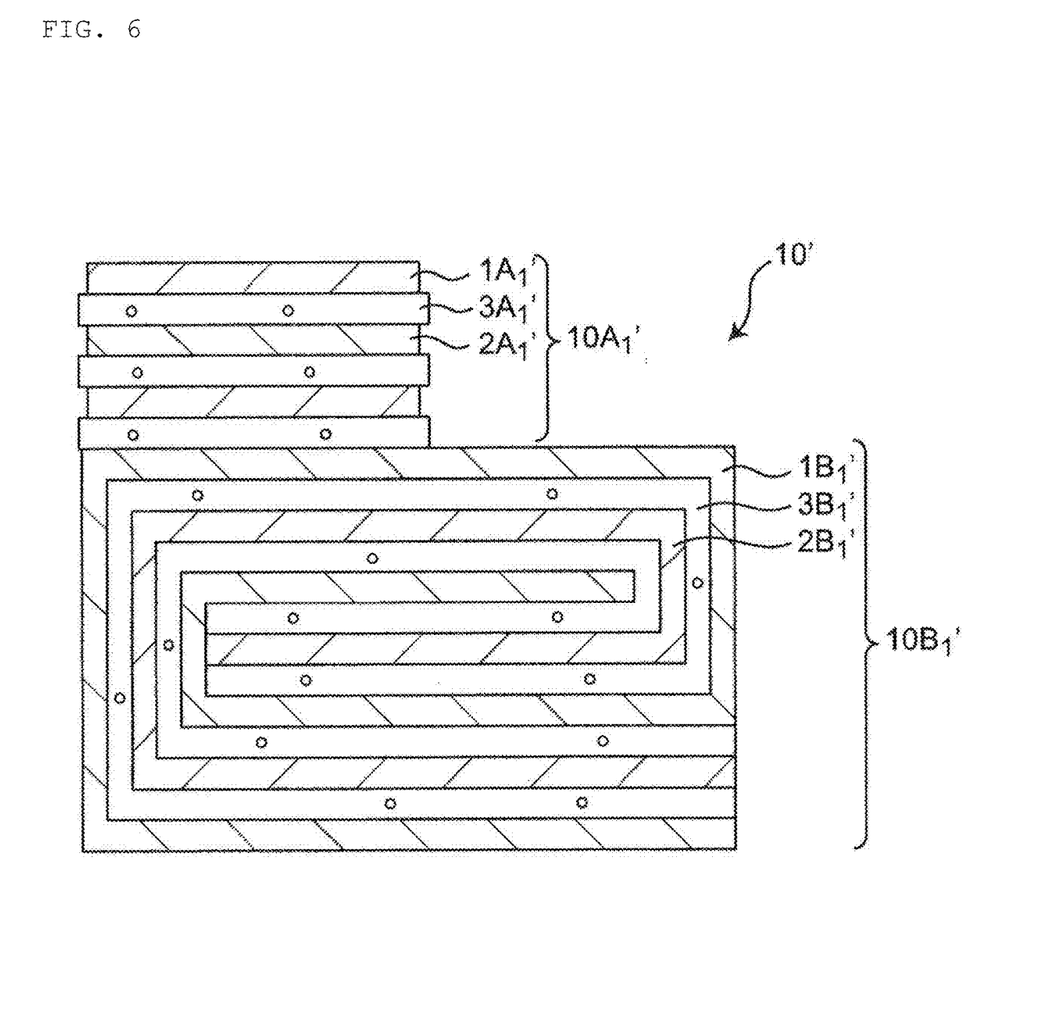
FIG. 6 is a cross-sectional view schematically showing an electrode assembly according to aspects of the present invention.

In another example, electrode assembly 10' may include at least a planar laminated structure sub-electrode assembly and a winding structure sub-electrode assembly (see FIG. 6). A planar laminated structure sub-electrode assembly $10A_1$' may be formed by laminating a plurality of unitary electrode units, including a positive electrode $1A_1$', a negative electrode $2A_1$', and a separator $3A_1$'. On the other hand, a winding structure sub-electrode assembly $10B_1$' may be formed by winding an electrode unit including a positive electrode $1B_1$', a negative electrode $2B_1$', and a separator $3B_1$' in a roll shape. In this case, as an example, in the electrode assembly 10', the winding structure sub-electrode assembly $10B_1$ may have a width dimension larger than the width dimension of the planar laminated structure sub-electrode assembly $10A_1$ in a section view as shown in FIG. 6, and may be in mutual contact with the planar laminated structure sub-electrode assembly $10A_1$ so as to be located below the planar laminated structure sub-electrode assembly $10A_1$.

Note that without being limited to this, in yet another example, the planar laminated structure sub-electrode assembly may have a width dimension larger than the width dimension of the winding structure sub-electrode assembly in a section view, and may be in mutual contact with the winding structure sub-electrode assembly so as to be located below the winding structure sub-electrode assembly.

In yet another example, the electrode assembly may include at least two winding structure sub-electrode assemblies (not shown). For example, the electrode assembly may include a first winding structure sub-electrode assembly and a second winding structure sub-electrode assembly. Both of the first winding structure sub-electrode assembly and the second winding structure sub-electrode assembly may be formed by winding an electrode unit including a positive electrode, a negative electrode, and a separator in a roll shape. In this case, as an example, in the electrode assembly, the second winding structure type planar laminated structure sub-electrode assembly may have a width dimension larger than the width dimension of the first winding structure sub-electrode assembly in a section view, and may be in mutual contact with the first winding structure sub-electrode assembly so as to be located below the first winding structure sub-electrode assembly.

A detailed explanation in regard to the aspects of the disclosure shown in FIG. 3 should not be necessary given the above disclosure, but any example wherein the electrode assembly includes at least a planar laminated structure sub-electrode assembly and a winding structure sub-electrode assembly (see FIG. 6) or the example wherein the electrode assembly includes at least two winding structure sub-electrode assemblies (not shown), a pattern using only a lead portion connecting lead tabs of each electrode may be applied, or from the viewpoint of improving the degree of freedom of installation of the external terminal, a pattern using both the lead portion and the connection portion may be applied.

The secondary battery according to the present disclosure can be used in various fields in which electricity storage is expected. Although it is merely an example, the secondary battery according to the present disclosure, particularly the nonaqueous electrolyte secondary battery, can be used for electricity/information/communication fields where mobile devices are used (for example fields of mobile devices such as mobile phones, smart phones, laptop computers and digital cameras, activity meters, arm computers, electronic paper etc.), household/small industrial applications (for example, fields of electric power tools, golf carts, household/nursing-care/industrial robots, etc.), large industrial applications (for example, fields of forklifts, elevators, harbor port cranes, etc.), transportation system fields (for example, fields of hybrid cars, electric vehicles, buses, trains, electric assisted bicycles, electric motorcycles, etc.) power system applications (for example, fields of various power generations, load conditioners, smart grids, household installation storage systems, etc.), IoT fields, space/deep sea applications (for example, fields of space probes, submersible ships, etc.), and combinations thereof.

DESCRIPTION OF REFERENCE SYMBOLS 100A, 100B: secondary battery
1, 1A, 1B: positive electrode
2, 2A, 2B: negative electrode
3, 3A, 3B: separator
10, 10A, 10B: electrode assembly
$10A_1$: first planar laminated structure sub-electrode assembly
$10A_2$: second planar laminated structure sub-electrode assembly
$10A_1'$: planar laminated structure sub-electrode assembly
$10B_1'$: winding structure sub-electrode assembly
20A, 20B: exterior body
20Aa: first step portion
$20Aa_1$: top surface of first step portion
$20Aa_2$: end side surface of first step portion
20Ab: second step portion
$20Ab_1$: top surface of second step portion
20Ba: first step portion
$20Ba_1$: top surface of first step portion
$20Ba_2$: end side surface of first step portion
20Bb: second step portion
$20Bb_2$: end side surface of second step portion
$20Bb_1$: top surface of second step portion
20Bc: third step portion
$20Bc_1$: top surface of third step portion
$20Ab_2$: stepped surface
$20Bb_2$: first stepped surface
$20Bc_2$: second stepped surface
30A, 30B: external terminal

The invention claimed is:

1. A secondary battery comprising:
an electrode assembly including a positive electrode, a negative electrode, and a separator between the positive electrode and the negative electrode;
an electrolyte; and
an exterior body which houses the electrode assembly and the electrolyte, wherein:
the exterior body has at least three step portions each having a height,
the at least three step portions comprises a low step portion having a first end side surface having a first height measured from a first edge of the first end side surface and a high step portion having a second height measured from the first edge, the first height being less than the second height,
the first height is a first linear dimension extending from a bottom surface of the low step portion of the exterior body to a top surface of the low step portion of the exterior body, the bottom surface of the low step portion of the exterior body comprising a first portion of the first edge,
the second height is a second linear dimension extending from a bottom surface of the high step portion of the exterior body to a top surface of the high step portion of the exterior body, the bottom surface of the high step portion of the exterior body comprising a second portion of the first edge,
the low step portion is adjacent to the high step portion,
a stepped surface is formed between the top surface of the low step portion and the top surface of the high step portion,
an external terminal of the secondary battery is exposed on the first end side surface of the low step portion having the first height,
the electrode assembly is provided within both of the low step portion and the high step portion, and
the first height is $H_{min}$, wherein $H_{min}$ is a smallest height of the heights of all step portions comprised by the exterior body.

2. The secondary battery according to claim 1, wherein the stepped surface forms a side surface of the high step portion.

3. The secondary battery according to claim 1, wherein the top surface of the low step portion is continuous with the stepped surface, wherein the stepped surface extends in a first direction and top surface of the low step portion extends in a second direction, wherein the first direction is different from the second direction.

4. The secondary battery according to claim 3, wherein the first direction is perpendicular to the second direction.

5. The secondary battery according to claim 1, wherein the stepped surface is adjacent to one side of the low step portion.

6. The secondary battery according to claim 1, wherein the electrode assembly comprises at least two sub-electrode assemblies having different width dimensions, wherein the at least two sub-electrode assemblies comprises the electrode assembly as a first sub-electrode assembly.

7. The secondary battery according to claim 6, wherein the at least two sub-electrode assemblies comprises the first sub-electrode assembly and a second sub-electrode assembly, the second sub-electrode assembly comprising a second positive electrode, a second negative electrode, and a second separator, wherein the first sub-electrode assembly has a planar laminated structure such that the positive electrode, the negative electrode, and the separator are laminated in a planar shape, and wherein the second sub-electrode assembly has a winding structure such that the second positive electrode, the second negative electrode, and the second separator are wound in a roll shape.

8. The secondary battery according to claim 1, wherein the electrode assembly has a planar laminated structure such that the positive electrode, the negative electrode, and the separator are laminated in a planar shape.

9. The secondary battery according to claim 1, wherein the electrode assembly has a winding structure such that the positive electrode, the negative electrode, and the separator are wound in a roll shape.

10. The secondary battery according to claim 1, wherein the positive electrode and the negative electrode have layers configured to store and release lithium ions.

11. A device comprising:
the secondary battery according to claim 1; and
a board provided on the top surface of the low step portion, and
wherein the external terminal is electrically connected to the board via wiring.

12. The device according to claim 11, wherein the board is a rigid board or a flexible board.

13. The device according to claim 11, wherein the board is a protective circuit board.

14. The device according to claim 11, wherein the positive electrode and the negative electrode have layers configured to store and release lithium ions.

15. The device according to claim 11, wherein the device is a mobile device.

* * * * *